Jan. 13, 1931.    G. T. BALFE    1,789,030
GASKET
Filed Sept. 15, 1930

Inventor
George T. Balfe
By Cushman Bryant & Darby
Attorneys

Patented Jan. 13, 1931

1,789,030

UNITED STATES PATENT OFFICE

GEORGE T. BALFE, OF DETROIT, MICHIGAN, ASSIGNOR TO DETROIT GASKET & MFG. CO., OF DETROIT, MICHIGAN, A CORPORATION OF MICHIGAN

GASKET

Application filed September 15, 1930. Serial No. 482,099.

This invention relates to gaskets and more particularly a gasket of the type employing a reinforcing member having one or more layers of gasket forming material secured thereto.

The principal object of the invention is to form a composite article which will be extremely resistant under the high pressures developed in constructions with which gaskets are associated as for example internal combustion motors, as well as fluid lines.

The construction of the present invention is one which will prevent ordinary blowing and should a blow or burn occur, the invention provides numerous barriers which will prevent tearing or further rupturing of the gasket.

An additional object of the invention is to provide a construction in which the gasket forming layer or layers will be firmly retained in position upon the reinforcing layer, and to this end the latter is provided with a multiplicity of protuberances and cavities on one or both surfaces, the protuberances being embedded in the gasket forming material and the gasket forming material itself being embedded in the cavities formed by the protuberances.

The protuberances may be of sufficient length that no adhesive will be required or where they are relatively shallow, some suitable means may be employed to cause the gasket material to adhere to the reinforcement.

Figure 1:
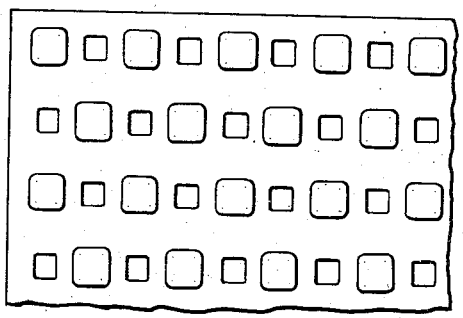
Figure 1 is a top plan view of my improved insert showing the protuberances and cavities.

Referring to Figure 1, there is disclosed a metal plate of preferably thin sheet metal, such as sheet steel, which is sufficiently flexible for the purpose.

This sheet is suitably die treated to produce therein a multiplicity of protuberances extending laterally from the plane of the sheet as indicated at 10 on one or both surfaces which provide laterally extending cavities opening into the opposite surface.

With the preferred construction, the protuberances will be formed upon each side, so that the sheet will comprise a multiplicity of closely associated or compacted protuberances and cavities upon each exposed surface, said cavities being of pocket formation as indicated at 11, 12.

The cavities 11 are preferably of a depth to receive a substantial portion of the gasket forming material when it is compressed upon the reinforcing plate. The gasket material may be applied either in sheet form or plastic or pulp form.

The cavities may be of a depth such as will retain the gasket forming material without recourse to any adhesive, and on the other hand relatively shallow cavities may be produced which may be lined with some suitable gum or glue to affix the gasket material layer securely to the insert.

The presence of a multiplicity of protuberances and cavities produces a series of barriers which under working conditions will maintain the gasket firmly against tearing and disintegration. In other words, should a portion of the gasket burn or blow, the protuberances and cavities which act to reinforce the gasket material forming layer, will serve to prevent enlargement of the blow or tear, so that in most cases the gasket may have a continuous and long use.

Figure 2:
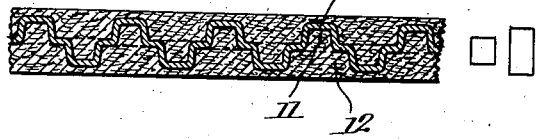
Figure 2 is a view showing the insert of Figure 1 applied between two layers of gasket forming material, the mouth of the cavity being either square or rectangular, as indicated by the line figures to the right of Figure 2.
Figure 3:
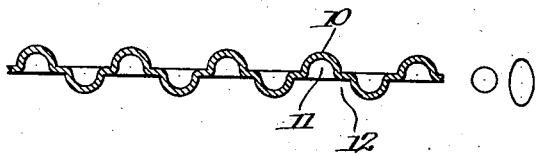
Figure 3 is a sectional view of a modification, the mouth of the cavities being either circular or oval shaped, as indicated by the line figures at the right of Figure 3.
Figure 4:
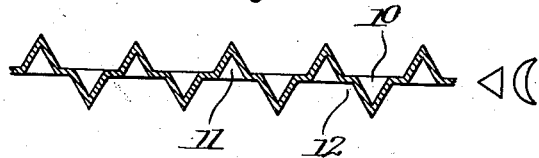
Figure 4 is a sectional view of a further modification, the mouth of the cavities being either triangular or crescent shaped, as shown by the line figures at the right of Figure 4.

The illustrations of the various shapes and forms of the protuberances and cavities, may be varied as desired, and I have simply illustrated several modifications to indicate changes which may be resorted to if desired. For example, pyramidal (as shown in Figure 4), polygonal (as shown in Figure 2), cup-shaped or knob-like (as shown in Figure 3) protuberances may be formed of any required size.

It will be understood that the protuberances and the cavities formed thereby are closed and are not punctured in any way.

The protuberances are preferably formed in parallel rows upon the opposite sides of the reinforcing sheet and the respective protuberances of each row are staggered with respect to those of the next adjacent row. This arrangement is followed both transversely and longitudinally of the sheet, so that parallel rows of staggered protuberances and cavities are formed throughout the sheet surface.

It will be understood from the drawing that the protuberances are spaced apart a distance varying in accordance with the number employed. Preferably they are closely compacted.

It will be understood that while I have illustrated the protuberances and cavities as being formed upon both sides of the insert, the protuberances may be struck from one side only, so that the insert will comprise a plurality of protuberances on one side and a corresponding number of cavities upon the opposite side.

In connection with Figure 4, wherein I have shown the mouth of the cavity 11 as being triangular or crescent shaped, it will be understood that it may also be in the shape of a semi-circle or segmental, as desired.

As stated, the invention is capable of further modification and the appended claim is considered to have a scope to cover various changes to which the invention is susceptible.

I claim:

A gasket comprising at least two layers of fibrous gasket forming material and a reinforcing plate therebetween having plane surfaces with a multiplicity of spaced relatively small closed protuberances extending laterally from each side of the plane of the plate, protuberances on one side forming corresponding closed cavities on the opposite side, the said protuberances being embedded in the gasket material layers and the layers themselves being embedded in said cavities to reinforce the layers throughout their thickness and barring passage of pressure through the protuberances to the surfaces of the gasket, the said protuberances presenting an uninterrupted contact surface to the fibres of the gasket forming material and the gasket forming material being compressed about said protuberances.

In testimony whereof I have hereunto set my hand.

GEORGE T. BALFE.